US012389230B2

(12) United States Patent
Garcia Martin et al.

(10) Patent No.: US 12,389,230 B2
(45) Date of Patent: Aug. 12, 2025

(54) ONBOARDING DEVICES IN STANDALONE NON-PUBLIC NETWORKS

(71) Applicant: Telefonaktiebolaget LM Ericsson (publ), Stockholm (SE)

(72) Inventors: Miguel Angel Garcia Martin, Madrid (ES); David Castellanos Zamora, Madrid (ES); Peter Hedman, Helsingborg (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 293 days.

(21) Appl. No.: 17/916,598

(22) PCT Filed: May 12, 2021

(86) PCT No.: PCT/IB2021/054066
§ 371 (c)(1),
(2) Date: Oct. 3, 2022

(87) PCT Pub. No.: WO2021/229474
PCT Pub. Date: Nov. 18, 2021

(65) Prior Publication Data
US 2023/0171603 A1 Jun. 1, 2023

(30) Foreign Application Priority Data
May 15, 2020 (EP) .................................... 20382410

(51) Int. Cl.
*H04W 12/30* (2021.01)
*H04W 4/50* (2018.01)
(Continued)

(52) U.S. Cl.
CPC ............. *H04W 12/35* (2021.01); *H04W 4/50* (2018.02); *H04W 12/06* (2013.01); *H04W 60/04* (2013.01)

(58) Field of Classification Search
CPC ....... H04W 12/35; H04W 4/50; H04W 12/06; H04W 60/04; H04W 8/18; H04W 8/20; H04W 12/71; H04W 12/72
See application file for complete search history.

(56) References Cited

U.S. PATENT DOCUMENTS 9,769,665 B2   9/2017 Lee et al.
10,743,176 B1* 8/2020 Khan ..................... H04W 12/48
(Continued)

FOREIGN PATENT DOCUMENTS

CN    107431701 A    12/2017
CN    111065132 A     4/2020
WO    2020037086 A1   2/2020

OTHER PUBLICATIONS

Ericsson, et al., "Control Plane based solution to boarding KI#4", Proposal, 3GPP TSG-SA WG2 Meeting #136AH, Jan. 13-18, 2020, Incheon, Korea, pp. 1-7, S2-2001534, 3GPP.
(Continued)

Primary Examiner — Brandon J Miller
(74) Attorney, Agent, or Firm — COATS & BENNETT, PLLC

(57) ABSTRACT

The present disclosure relates to supporting provisioning of a User Equipment (UE) with credentials to access a communication network, such as a Standalone Non-Public Network (SNPN). A credential server stores a binding associating UE device information, including an onboarding identifier, with network information for the SNPN. The credential server receives, from a network function in an onboarding network, a request for authentication of the UE that includes the onboarding identifier. The credential server responds with a message comprising the network information bound to the device information to enable provisioning of the credentials to the UE.

16 Claims, 15 Drawing Sheets

(51) Int. Cl.
*H04W 12/06* (2021.01)
*H04W 60/04* (2009.01)

(56) References Cited

U.S. PATENT DOCUMENTS

2021/0058784 A1* 2/2021 Kedalagudde ........ H04W 76/12
2021/0092021 A1* 3/2021 Choukir .................. H04L 41/12

OTHER PUBLICATIONS

Intel, et al., "Solution for UE Onboarding and provisioning for an SNPN", Proposal, SA WG2 Meeting #S2-136AH, Jan. 13-17, 2020, Incheon, South Korea, pp. 1-6, S2-2001670 (rev of S2-2001533), 3GPP.

3rd Generation Partnership Project, "3rd Generation Partnership Project; Technical Specification Group Services and System Aspects; Study on enhanced support of non-public networks (Release 17)", Technical Report, 3GPP TR 23.700-07 V0.3.0, Jan. 1, 2020, pp. 1-42, 3GPP.

3rd Generation Partnership Project, "3rd Generation Partnership Project; Technical Specification Group Services and System Aspects; System architecture for the 5G System (5GS); Stage 2 (Release 16)", Technical Specification, 3GPP TS 23.501 V16.4.0, Mar. 1, 2020, pp. 1-430, 3GPP.

3rd Generation Partnership Project, "3rd Generation Partnership Project; Technical Specification Group Services and System Aspects; Procedures for the 5G System (5GS); Stage 2 (Release 16)", Technical Specification, 3GPP TS 23.502 V16.4.0, Mar. 1, 2020, pp. 1-582, 3GPP.

3rd Generation Partnership Project, "3rd Generation Partnership Project; Technical Specification Group Services and System Aspects; Study on enhanced support of Non-Public Networks (NPN) (Release 17)", Technical Report, 3GPP TR 23.700-07 V17.0.0, Mar. 1, 2021, pp. 1-248, 3GPP.

* cited by examiner

ONBOARDING DEVICES IN STANDALONE NON-PUBLIC NETWORKS

RELATED APPLICATIONS

The present application claims priority to European Application No. EP 20382410.7, which was filed on May 15, 2020, the disclosure of which is incorporated herein by reference in its entirety.

TECHNICAL FIELD

The present disclosure relates generally to standalone non-public networks (SNPN) and, more particularly, to procedures for onboarding devices in a standalone communication network.

BACKGROUND

The Fifth Generation (5G) standard developed by the Third Generation Partnership Project (3GPP) includes support for non-public networks (NPNs), which are defined as "a network that is intended for non-public use" in 3GPP Technical Specification (TS) 22.261, Section 6.25. In general, NPNs are intended for use by a single entity, such as a large enterprise. One application for NPNs is in industrial automation with requirements for very low latency. NPNs can be deployed as standalone networks referred to as standalone NPNs (SNPNs). NPNs. can also be hosted by Public Land Mobile Networks (PLMNs) or configured as a slice of a PLMN.

Regardless of the deployment scenario, all UEs within the NPN need to be provisioned with credentials to access the NPN. The UEs are typically manufactured by third party manufacturers and are not initially provisioned with credentials for accessing the NPN. Rather, provisioning is usually done when the UEs are purchased by a subscription owner, which is typically the owner of the NPN. The 5G standards provides a general outline of procedures for provisioning UEs with credentials for accessing a NPN. Generally, the UE initially registers with an onboarding network, which initiates a provisioning procedure with the NPN. Once the UE is provisioned with credentials for the NPN, the UE deregisters from the onboarding network and establishes a connection with the NPN using the obtained credentials.

While existing procedures define the parties involved in the onboarding process, there are many aspects of the onboarding process that remain undefined and/or unresolved. One problem is that the UE is not provisioned in advance with information about the NPN of the subscription owner. Therefore, procedures are needed for network selection and routing of traffic related to provisioning. Further, it is expected that UEs will not attempt to access NPNs not associated with the subscription owner, which would burden resources in other NPNs. Therefore, procedures are needed to prevent rogue or malicious UEs from attempting to access an NPN other than one authorized by the subscription owner. Finally, different NPNs may have different procedures for provisioning UEs to access the NPN. A method is needed for the onboarding network to determine what procedures to use to provision the UE.

SUMMARY

The present disclosure relates to provisioning of a UE with credentials to access a communication network, such as a SNPN. According to an aspect of the present disclosure, a Default Credential Server (DCS) maintains a binding of UE onboarding credentials and a UE identifier with network information for the authorized SNPN. Therefore, pre-provisioning of the network information at the time of manufacture is not required. Rather, the manufacturer can update the DCS with the network information for the UE when the UE is acquired by the SNPN. Storing the network information in the DCS avoids the need to flash the firmware when the UE is manufactured or reflash the firmware when the UE is acquired. To initiate the onboarding process, the UE 50 sends an onboarding request containing the UE identifier to a network node in an onboarding network and the network node queries the DCS to retrieve the network information. After obtaining the network information from the DCS, the onboarding network requests authorization from a provisioning server to initiate a provisioning procedure with the SNPN. The provisioning server verifies that the UE is authorized to access the SNPN and determines the type of provisioning procedure to use (e.g., control plane provisioning or user plane provisioning). If verification is successful, the provisioning server sends a response authorizing the onboarding network to initiate provisioning of the UE and indicating the type of provisioning procedure to use. The authorization procedure prevents rogue or malicious UEs from attempting to initiate a provisioning procedure with the SNPN without prior authorization.

A first aspect of the disclosure comprises methods implemented by a credential server for providing network information for a communication network, e.g. SNPN, to an onboarding network to enable provisioning of credentials to the UE to access the communication network. The method comprises storing a binding associating device information for the UE and network information identifying the communication network. The device information includes an onboarding identifier for the UE. The method further comprises receiving, from a network function in an onboarding network, a message including the onboarding identifier for the UE. The method further comprises sending, to the network function in the onboarding network, the network information bound to the device information for the UE to enable provisioning of credentials to the UE to access the communication network.

A second aspect of the disclosure comprises methods implemented by a network node in an onboarding network for obtaining network information for a communication network, e.g., SNPN, from a DCS to enable provisioning of credentials to the UE to access the communication network. The method comprises sending a message including an onboarding identifier for the UE to a DCS. The method further comprises receiving, from the DCS, network information bound to the device information for the UE to enable provisioning of credentials to the UE to access the communication network.

A third aspect of the disclosure comprises methods implemented by a network node in an onboarding network to obtain authorization for provisioning of a UE with credentials to access a communication network, e.g., SNPN. The method comprises sending, to a network function, an onboarding authorization request to authorize provisioning of credentials to the UE to access the communication network. The onboarding authorization request includes an onboarding identifier for the UE. The method further comprises receiving an onboarding authorization response from the network function in the communication network allowing or rejecting the onboarding request. The method further comprises initiating an onboarding procedure when the authorization response indicates that provisioning of the UE is allowed.

A fourth aspect of the disclosure comprises methods implemented by a provisioning server in a communication network to authorize provisioning of a UE with credentials to access a communication network, e.g., SNPN. The method comprises receiving, from a network function in an onboarding network, an onboarding authorization request to authorize provisioning of credentials to the UE to access the communication network. The onboarding authorization request includes an onboarding identifier for the UE. The method further comprises verifying the onboarding identifier provided in the onboarding authorization request. The method further comprises sending an onboarding authorization response to the network function in the onboarding network allowing or rejecting the onboarding authorization request depending on verification of the onboarding identifier.

A fifth aspect of the disclosure comprises a credential server (e.g., DCS) configured to provide network information for a communication network, e.g., SNPN, to an onboarding network to enable provisioning of credentials to the UE to access the communication network. The credential server is configured to store a binding associating device information for the UE and network information identifying the communication network. The device information includes an onboarding identifier for the UE. The credential server is further configured to receive, from a network function in an onboarding network, a message including the onboarding identifier for the UE. The credential server is further configured to send, to the network function in the onboarding network, the network information bound to the device information for the UE to enable provisioning of credentials to the UE to access the communication network.

A sixth aspect of the disclosure comprises a network node in an onboarding network configured to obtain network information for a communication network, e.g., SNPN, from a DCS to enable provisioning of credentials to the UE to access the communication network. The network node (e.g., AMF) is configured to send a message including an onboarding identifier for the UE to a DCS. The network node is further configured to receive, from the DCS, network information bound to the device information for the UE to enable provisioning of credentials to the UE to access the communication network.

A seventh aspect of the disclosure comprises methods implemented by a network node (e.g., AMF) in an onboarding network configured to obtain authorization for provisioning of a UE with credentials to access a communication network, e.g., SNPN. The network node is configured to send, to a network function, an onboarding authorization request to authorize provisioning of credentials to the UE to access the communication network. The onboarding authorization request includes an onboarding identifier for the UE. The network node is further configured to receive an onboarding authorization response from the network function in the communication network allowing or rejecting the onboarding request. The network node is further configured to initiate an onboarding procedure when the authorization response indicates that provisioning of the UE is allowed.

An eighth aspect of the disclosure comprises methods implemented by a provisioning server in a communication network, e.g., SNPN, configured to authorize provisioning of a UE with credentials to access a communication network, e.g., communication network. The provisioning server is configured to receive, from a network function in an onboarding network, an onboarding authorization request to authorize provisioning of credentials to the UE to access the communication network. The onboarding authorization request includes an onboarding identifier for the UE. The provisioning server is further configured to verify the onboarding identifier provided in the onboarding authorization request. The provisioning server is further configured to send an onboarding authorization response to the network function in the onboarding network allowing or rejecting the onboarding authorization request depending on verification of the onboarding identifier.

A ninth aspect of the disclosure comprises a credential server configured to provide network information for a communication network, e.g., SNPN, to an onboarding network to enable provisioning of credentials to the UE to access the communication network. The credential server (e.g., DCS) comprises communicating circuitry for communicating with a network node in an onboarding network over a communication network, and processing circuitry. The processing circuitry is configured to store a binding associating device information for the UE and network information identifying the communication network. The device information includes an onboarding identifier for the UE. The processing circuitry is further configured to receive, from a network function in an onboarding network, a message including the onboarding identifier for the UE. The processing circuitry is further configured to send, to the network function in the onboarding network, the network information bound to the device information for the UE to enable provisioning of credentials to the UE to access the communication network.

A tenth aspect of the disclosure comprises a network node in an onboarding network configured to obtain network information for a communication network, e.g., SNPN, from a DCS to enable provisioning of credentials to the UE to access the communication network. The network node comprises communicating circuitry for communicating with a credential server over a communication network, and processing circuitry. The processing circuitry is configured to send a message including an onboarding identifier for the UE to a DCS. The processing circuitry is further configured to receive, from the DCS, network information bound to the device information for the UE to enable provisioning of credentials to the UE to access the communication network.

An eleventh aspect of the disclosure comprises a network node in an onboarding network configured to obtain authorization for provisioning of a UE with credentials to access a communication network, e.g., SNPN. The network node comprises communicating circuitry for communicating with a credential server over a communication network, and processing circuitry. The processing circuitry is configured to send, to a network function, an onboarding authorization request to authorize provisioning of credentials to the UE to access the communication network. The onboarding authorization request includes an onboarding identifier for the UE. The processing circuitry is further configured to receive an onboarding authorization response from the network function allowing or rejecting the onboarding request. The processing circuitry is further configured to initiate an onboarding procedure when the authorization response indicates that provisioning of the UE is allowed.

A twelfth aspect of the disclosure comprises methods implemented by a provisioning server (e.g., DCS) in a communication network, e.g., SNPN, configured to authorize provisioning of a UE with credentials to access a communication network. The provisioning server comprises communicating circuitry for communicating with a network node in an onboarding network, and processing circuitry. The processing circuitry is configured to receive, from a network function in an onboarding network, an onboarding authorization request to authorize provisioning of credentials to the UE to access the communication network. The onboarding authorization request includes an onboarding identifier for the UE. The processing circuitry is further configured to verify the onboarding identifier provided in the onboarding authorization request. The processing circuitry is further configured to send an onboarding authorization response to the network function in the onboarding network allowing or rejecting the onboarding authorization request depending on verification of the onboarding identifier.

A thirteenth aspect of the disclosure comprises a computer program for a credential server. The computer program comprises executable instructions that, when executed by processing circuitry in the credential server causes the credential server to perform the method according to the first aspect.

A fourteenth aspect of the disclosure comprises a computer program for a network node in an onboarding network. The computer program comprises executable instructions that, when executed by processing circuitry in the network node causes the network node to perform the method according to the second aspect.

A fifteenth aspect of the disclosure comprises a computer program for a network node in an onboarding network. The computer program comprises executable instructions that, when executed by processing circuitry in the network node causes the network node to perform the method according to the third aspect.

A sixteenth aspect of the disclosure comprises a computer program for a provisioning server is a communication network. The computer program comprises executable instructions that, when executed by processing circuitry in the provisioning server causes the provisioning server to perform the method according to the fourth aspect.

A seventeenth aspect of the disclosure comprises a carrier containing a computer program according to the thirteenth aspect. The carrier is one of an electronic signal, optical signal, radio signal, or a non-transitory computer readable storage medium.

An eighteenth aspect of the disclosure comprises a carrier containing a computer program according to the fourteenth aspect. The carrier is one of an electronic signal, optical signal, radio signal, or a non-transitory computer readable storage medium.

A nineteenth aspect of the disclosure comprises a carrier containing a computer program according to the fifteenth aspect. The carrier is one of an electronic signal, optical signal, radio signal, or a non-transitory computer readable storage medium.

A twentieth aspect of the disclosure comprises a carrier containing a computer program according to the sixteenth aspect. The carrier is one of an electronic signal, optical signal, radio signal, or a non-transitory computer readable storage medium.

DETAILED DESCRIPTION

Figure 1:
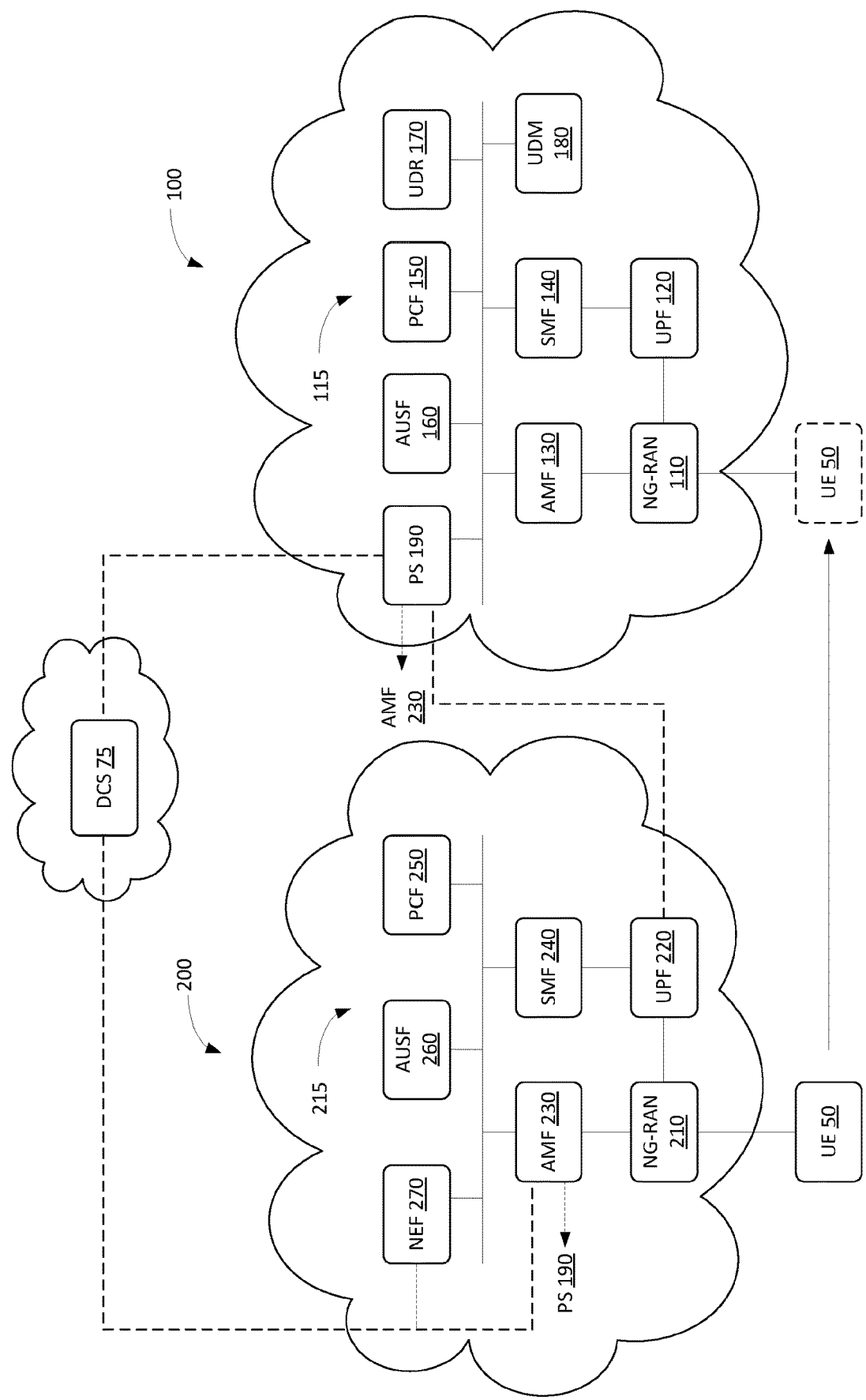
FIG. 1 illustrates an exemplary SNPN and an onboarding network configured to facilitate provisioning a UE to access the SNPN.

Referring now to the drawings, techniques for provisioning user equipment (UEs) 50 with credentials to access a communication network will be described in the context of a SNPN 100. In the exemplary embodiment, the SNPN 100 is a 5G network implementing A 5G Core (5GC) 115 and Next Generation Radio Access Network (NG-RAN) 120. Those skilled in the art will appreciate, however that the techniques are not limited to use in provisioning UEs to access SNPNs 100 or 5G networks but could be applied to enable UEs 50 to access other types of public or private communication networks, both wired and wireless.

FIG. 1 illustrates an exemplary SNPN 100. The SNPN 100 is a fully functional 5G network comprising a NG-RAN 110 and 5G Core (5GC) 115. The NG RAN 110 comprises one or more base stations, also known as 5G NodeBs (gNBs) and Next Generation Evolved Node Base station (ng-eNBs), that communicate with UEs 50 authorized by the SNPN 100. The 5GC 115 comprises a User Plane Function (UPF) 120, Access and Mobility Management Function (AMF) 130, Session Management Function (SMF) 140, Policy Control Function (PCF) 150, Authentication Server Function (AUSF) 160, Unified Data Repository (UDR) 170 and Unified Data Management (UDM) Function 180. The SNPN 100 may further include a provisioning server 190 for provisioning UEs 50 with credentials to access the SNPN 100. Alternatively, the provisioning server 190 could be a network node external to the SNPN 100 that is controlled by or trusted by the SNPN 100. The PS 190 in the SNPN 100 communicates with the DCS 75

Provisioning of UEs 50 with credentials to access the SNPN 100 is facilitated with the aid of an onboarding network 200 and default credential server (DCS) 75. Generally, the UE 50 initially registers with the onboarding network 200, which initiates an onboarding procedure with the SNPN 100. The onboarding network 200 fetches information about the SNPN 100 from the DCS 75 and initiates a provisioning procedure with the SNPN 100. Once the UE 50 is provisioned with credentials for the SNPN 100, the UE 500 deregisters from the onboarding network and establishes a connection with the SNPN 100 using the obtained credentials.

The onboarding network 200 may also comprise a 5G network including a NG-RAN 210 and a 5GC 215. The NG RAN 210 comprises one or more base stations (e.g., gNBs or ng-eNBs) that communicate with UEs 50 authorized by the onboarding network 200. The 5GC 215 in the onboarding network 200 comprises a UPF 220, AMF 230, SMF 240, PCF 250 and AUSF 260. The 5GC in the onboarding network 200 may further include a Network Exposure Function (NEF) 270. The UPF 220 and AMF 230 in the onboarding network 200 communicate with the PS 190 in the SNPN 100 as hereinafter explained in more details. The AMF 230 in the onboarding network 200 also communicates with the DCS 75.

Figure 2:
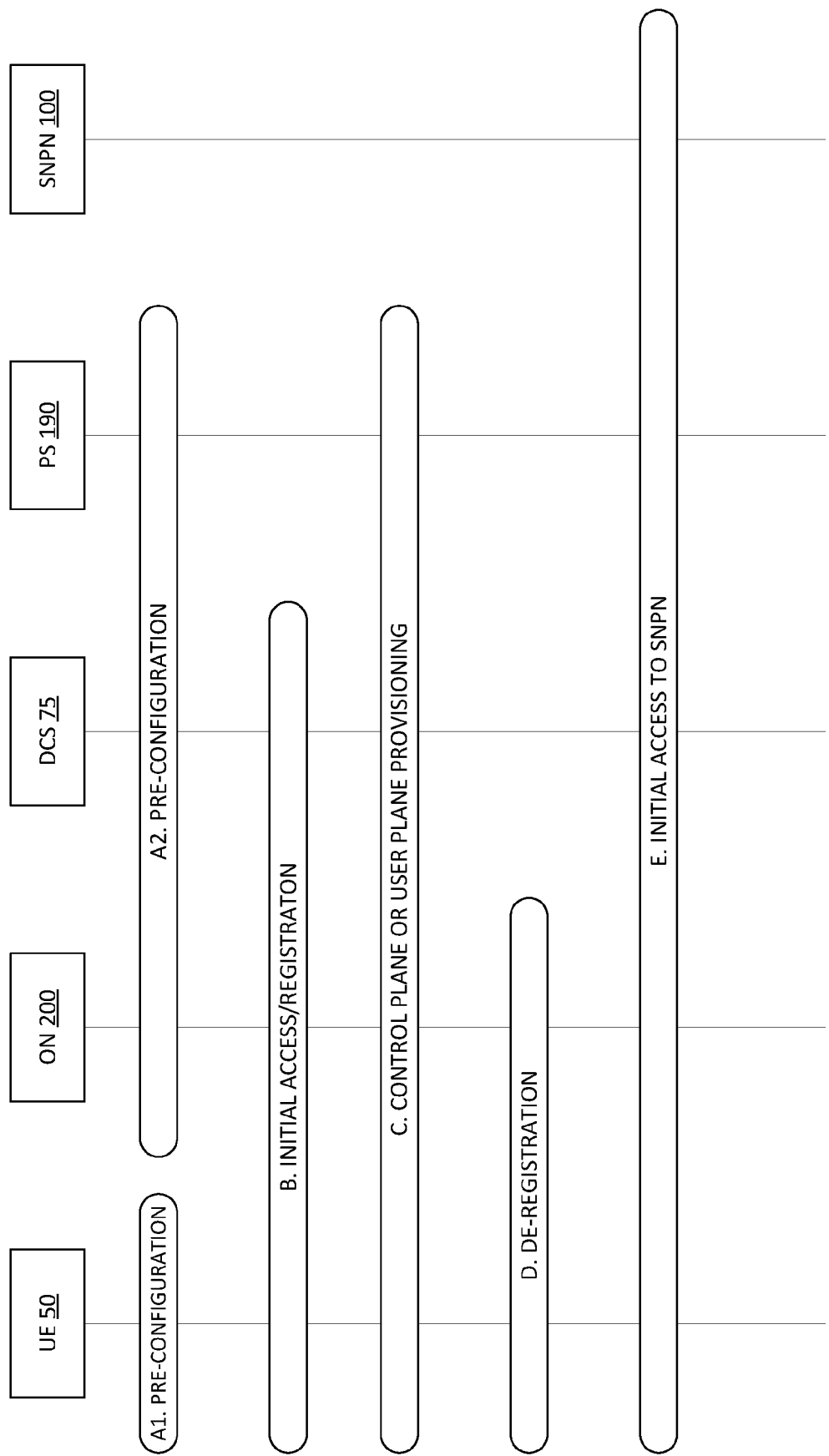
FIG. 2 illustrates an exemplary onboarding procedure for provisioning a UE to access a SNPN.

FIG. 2 illustrates an exemplary onboarding procedure for provisioning a UE 50 with credentials to access the SNPN 100. The process for onboarding the UE 50 is as follows:

A1. Some minimum configuration in the UE 50 is needed. The UE 50 cannot be provisioned with information of the SNPN 100, because this would require provisioning or updating its firmware after the UE 50 has been manufactured, but prior to selling it to the SNPN 100. Rather, the UE 50 is provisioned with a UE identifier, such as a Medium Access Control (MAC) address, host identifier (Host ID), or Permanent Equipment Identifier (PEI), assigned by the DCS 75 and onboarding UE credentials, such as a digital certificate, signed by the DCS 75, and valid only for onboarding procedures.

A2. Some configuration is also needed in the PS 190, DCS 75, and onboarding network 200. The UE 50 is registered with the DCS 75 by the manufacturer and stores a UE identifier, such as a MAC address, Host ID or PEI. The DCS 75 provides the UE identifier and UE credentials to the onboarding network 200 to enable the UE 50 to access the onboarding network. When the subscription owner (e.g., SNPN owner) acquires one or more UEs 50, it provisions its PS 190 with the UE identifiers provided by the DCS 75, along with the data that needs to be provisioned into the UE 50, such as regular UE credentials for the SNPN 100, network configuration (network slice information, UE policies, etc.)

B. The UE 50 performs a registration with the onboarding network 200 for the limited purpose of onboarding. The registration is made using a Subscription Concealed Identifier (SUCI) or Subscription Permanent Identifier (SUPI) generated from the UE identifier assigned by the DCS 75. This SUCI/SUPI is referred to herein as the onboarding identifier and is not useful for any other purpose. The special registration for onboarding includes the authentication of the UE 50 using the onboarding SUCI/SUPI and onboarding UE credentials provided by the DCS 75.

C. A provisioning procedure is performed to provide the UE 50 with its regular UE credentials and additional configuration for accessing the SNPN. The provisioning procedure may comprise a control plane provisioning procedure or a user plane provisioning procedure.

D. Once the provisioning procedure is completed, the UE de-registers from the onboarding network.

E. The UE 50 uses its regular UE credentials to access the SNPN 100 and establish a Packet Data Unit (PDU) session with the SNPN 100 using regular procedures (registration, PDU session establishment, etc.).

While the procedure shown in FIG. 2 defines the parties involved in the onboarding process, there are many aspects of the onboarding process that remain undefined and/or unresolved. One problem is that the UE 50 is not provisioned in advance with information about the SNPN 100. Therefore, procedures are needed for network selection and routing of traffic related to provisioning. Further, procedures are needed to prevent rogue or malicious UEs 50 from attempting to access an NPN other than SNPN 100 of the subscription owner. Additionally, the onboarding network 200 needs to determine what procedures to use to provision the UE 50.

According to one aspect of the present disclosure, the DCS 75 maintains a binding of the UE 50 onboarding credentials and a UE identifier (e.g., MAC address, Host ID, PEI) with network information for the authorized SNPN 100. Therefore, pre-provisioning of the UE 50 with network information by the manufacturer is not required. The UE 50 sends an onboarding request containing the UE identifier to a network node in an onboarding network 200 and the network node queries the DCS 75 to retrieve the network information. After obtaining the network information from the DCS 75, the onboarding network 200 requests authorization from a provisioning server 190 in the SNPN 100 to initiate a provisioning procedure with the SNPN 100. The provisioning server 190 verifies that the UE 50 is authorized to access the SNPN 100 and determines the type of provisioning procedure to use (e.g., control plane provisioning or user plane provisioning). If verification is successful, the provisioning server 190 sends a response authorizing the onboarding network to initiate provisioning of the UE 50 and indicating the type of provisioning procedure to use. The authorization procedure prevents rogue or malicious UEs 50 from attempting to initiate a provisioning procedure with the SNPN without prior authorization.

The binding of the UE credentials and UE identifier with the network information of the SNPN 100 can be defined in the DCS 75 after the UE 50 is manufactured and when the device is sold to a certain SNPN 100. The network information comprises data identifying the SNPN 100, such as the PLMN ID and Network Identifier (NID) of the SNPN 100. It is also possible that the DCS 75 is configured with more than one network owning the SNPN 100 (e.g. each related to a region or different SNPNs have agreements with different onboarding networks 200) and optionally with information, such as a fully qualified domain name (FQDN), to reach the provisioning server 190 for the SNPN 100.

After the purchase of a given UE 50 (or most likely a batch of UEs 50), the SNPN 100 configures its provisioning server 190 with the onboarding SUPIs, which are computed based on the UE identifiers assigned by the DCS 75. These onboarding SUPIs configured in the SNPN 100 are authorized to subsequently perform onboarding in the SNPN 100. The configured identities can be complete or part of the onboarding SUPIs, or equivalent information to enable authorization.

The SNPN 100 may also statically allocate a regular SUPI and corresponding credentials for accessing the SNPN 100 to each onboarding SUPI, together with additional data that needs to be provisioned to the UE 50 at this stage too. Alternatively, the regular UE credentials in the SNPN 100 and additional UE configuration may be dynamically generated by the SNPN 100 at a later stage during the onboarding procedure.

Figure 3:
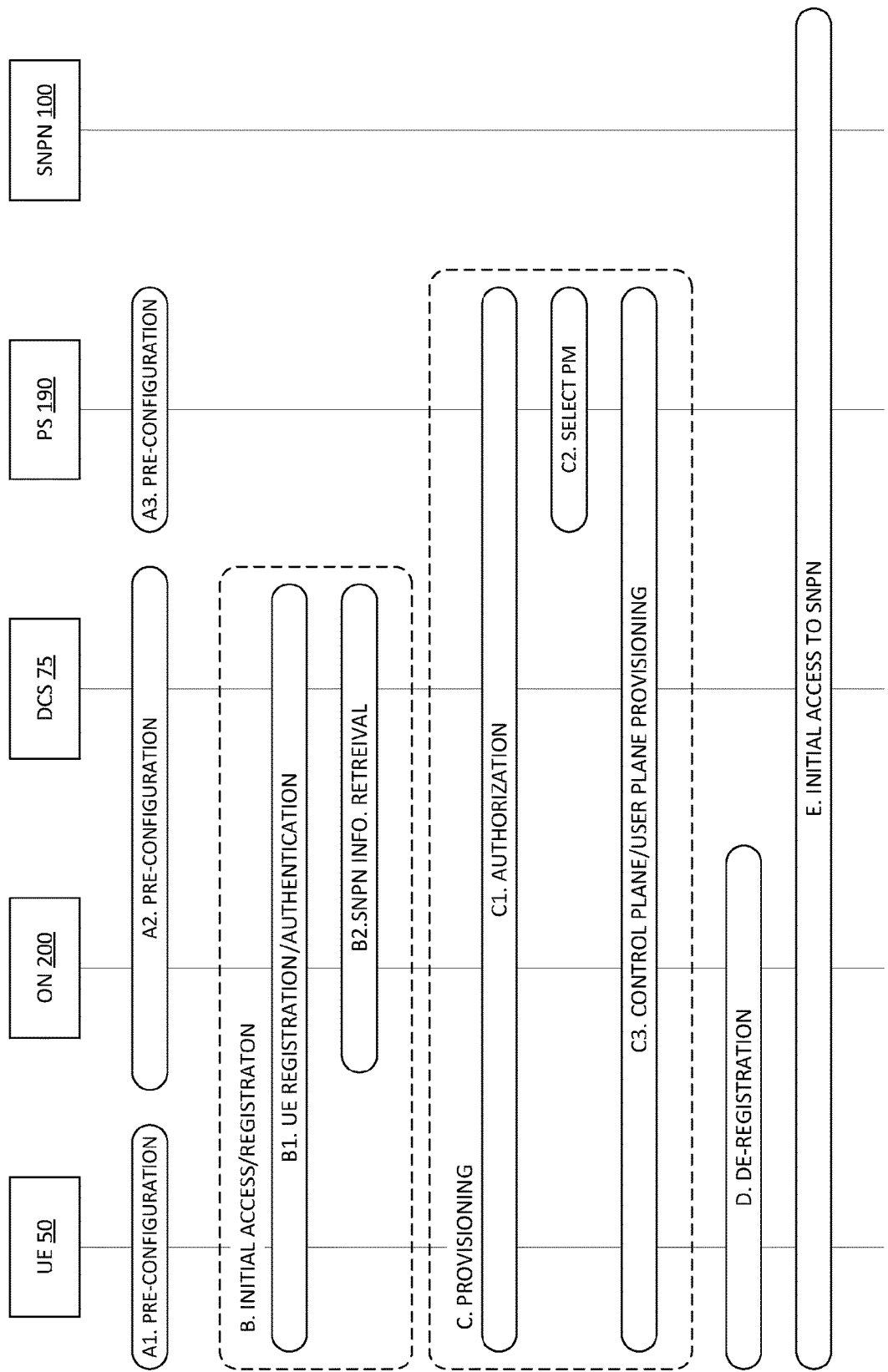
FIG. 3 illustrates a general onboarding procedure for provisioning a UE to access a SNPN.

FIG. 3 illustrates an onboarding procedure for provisioning a UE 50 to access a SNPN 100 that improves upon the network selection and security issues. The procedure shown in FIG. 3 follows the same general outline as the onboarding procedure in FIG. 2 with the following modifications:

A1: The UE 50 is provisioned with onboarding credentials as previously described.

A2: The DCS 75 and onboarding network 200 are provisioned as previously described. In addition, the DCS 75 stores a binding of the onboarding UE credentials and the UE identifier (e.g., Host ID, MAC address, PEI, etc.) with the network information for the SNPN 100. The DCS 75 could be operated by the device manufacturer or another third party. The binding can be defined in the DCS 75 after the UE 50 is manufactured and when the device is sold to a certain SNPN 100. The network information comprises data identifying the SNPN 100, such as the PLMN ID and NID of the SNPN 100. It is also possible that the DCS 75 is configured with more than one network owning the SNPN 100 (e.g., each related to a region or different SNPNs 100 have agreements with different onboarding networks 200) and optionally with information, such as a fully qualified domain name (FQDN), to reach the provisioning server 190 for the SNPN 100.

A3: The SNPN 100 configures the provisioning server 190 by adding the onboarding SUCI/SUPI to the list of authorized UEs 50. The onboarding SUCI/SUPI will be used in the authentication of the UE 50 as hereinafter described. In some embodiments, the SNPN 100 provides the provisioning server 190 with a regular SUPI and corresponding credentials for accessing the SNPN 100 along with additional data that needs to be provisioned to the UE during the initial provisioning. Alternatively, the regular UE credentials in the SNPN 100 and additional UE configuration may be dynamically generated by the SNPN 100 at a later stage (i.e. after UE onboarding authorization in C1 or during actual User Plane or Control Plane UE provisioning procedure in step D1 or D2/D3).

B1: The UE 50 performs a registration with the onboarding network 200 for the limited purpose of onboarding. The special registration for onboarding includes the authentication of the UE 50 using the onboarding SUCI/SUPI and onboarding UE credentials provided by the DCS 75.

B2: The onboarding network 200 retrieves network information from the DCS 75 that identifies the SNPN 100 owning the subscription for the UE 50 that is attempting the onboarding. This includes the PLMN ID and optionally the NID of the SNPN 100. The NID is not needed in case PLMN ID is unique (e.g., SNPN 100 is actually a PLMN). The PLMN ID and NID is used by the onboarding network 200 to route to the SNPN 100.

C1: The onboarding network 200 provides the onboarding SUCI/SUPI to the provisioning server 190 for the SNPN 100. The provisioning server 190 verifies that the onboarding network 200 is trusted for onboarding purposes, and then verifies internally that the identity of the UE 50 is authorized to perform the onboarding procedure. In some embodiments, the SNPN 100 dynamically generates the regular UE credentials in the SNPN 100 after authorizing the onboarding procedure.

C2: The provisioning server 190, based on UE capabilities, agreements with the onboarding network 200, and local policy, decides whether a control plane UE provisioning or user plane UE provisioning procedure should be used. The provisioning server 190 informs the onboarding network 200 about the selected UE provisioning method (PM).

C3: A provisioning procedure is performed to provide the UE 50 with its regular UE credentials and additional configuration for accessing the SNPN. The provisioning procedure may comprise a control plane provisioning procedure or a user plane provisioning procedure as instructed by the SNPN 100. In some embodiments, the SNPN 100 dynamically generates the regular UE credentials in the SNPN 100 during the control plane UE provisioning or user plane UE provisioning step.

D. Once the provisioning procedure is completed, the UE de-registers from the onboarding network 200.

E. The UE 50 uses its regular UE credentials to access the SNPN 100 and establish a Packet Data Unit (PDU) session with the SNPN 100 using regular procedures (registration, PDU session establishment, etc.).

Figure 4:
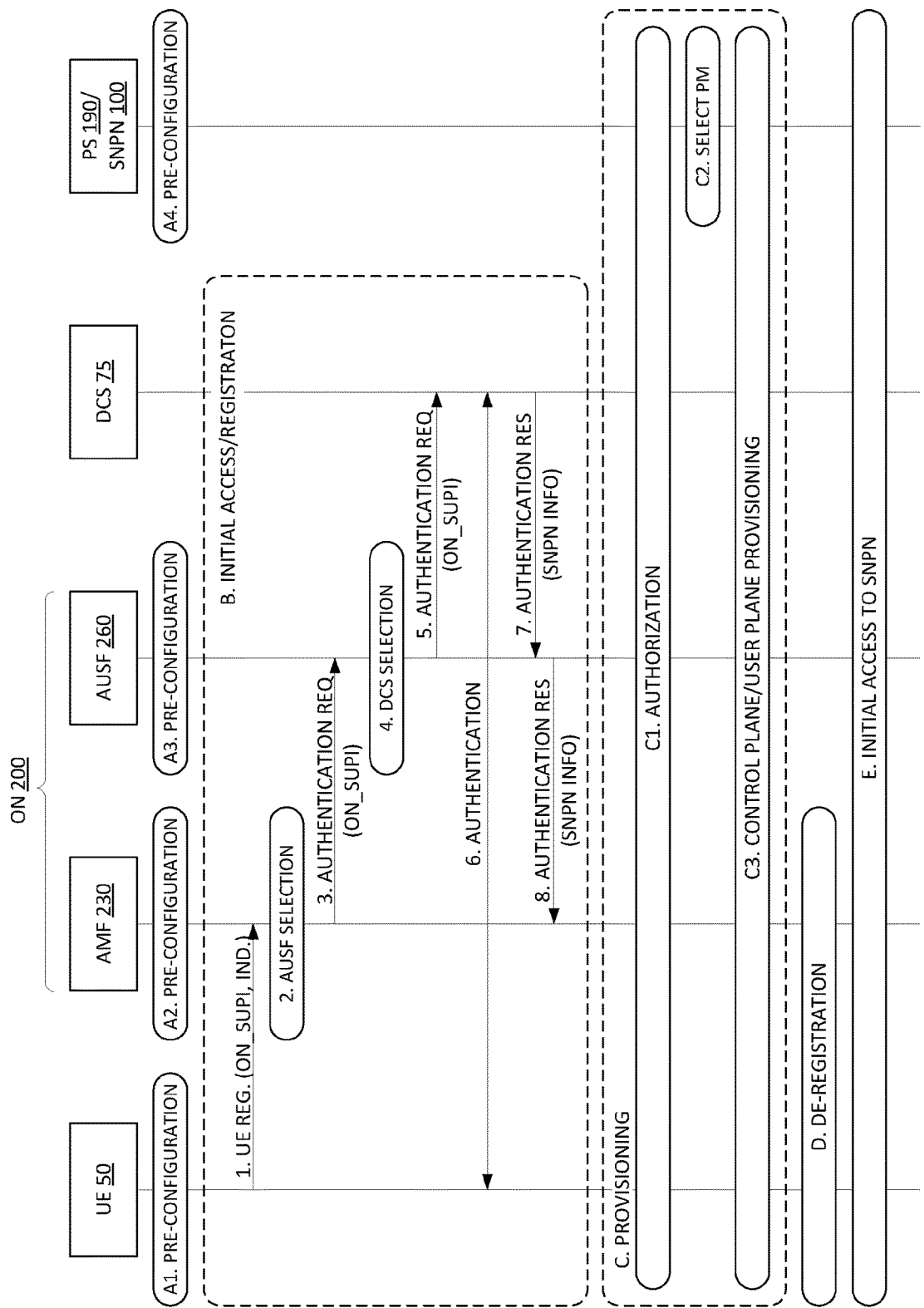
FIG. 4 illustrates an embodiment of the general procedure shown in FIG. 3 providing further details explaining how network information is retrieved from the DCS. In this example, the network information is piggybacked on existing authentication signaling.

FIG. 4 illustrates an exemplary method for retrieving network information from the DCS 75. In this embodiment, the SNPN information retrieval (B2 in FIG. 3) is collapsed into the UE registration (B1 in FIG. 3) and the network information is piggybacked on existing Extensible Authentication Protocol (EAP) signaling during the registration procedure.

The SNPN information retrieval proceeds as follows:

B1. The UE 50 sends a registration request to the AMF 230 in the onboarding network 200.

B2. The AMF 230 selects an AUSF 260.

B3. The AMF 230 sends an authentication request to the selected AUSF 260 with the onboarding SUPI of the UE 50.

B4. The AUSF 260 selects a DCS 75.

B5. The AUSF 260 sends an authentication request to the selected DCS 75.

B6. The DCS 75 and UE 50 perform EAP authentication procedures.

B7. After the DCS 75 authenticates the onboarding SUPI, it sends and authentication response containing the network information (SNPN info) for the SNPN 100.

B8. The AUSF 260 sends an authentication response containing the network information (SNPN info) to the AMF 230.

Figure 5:
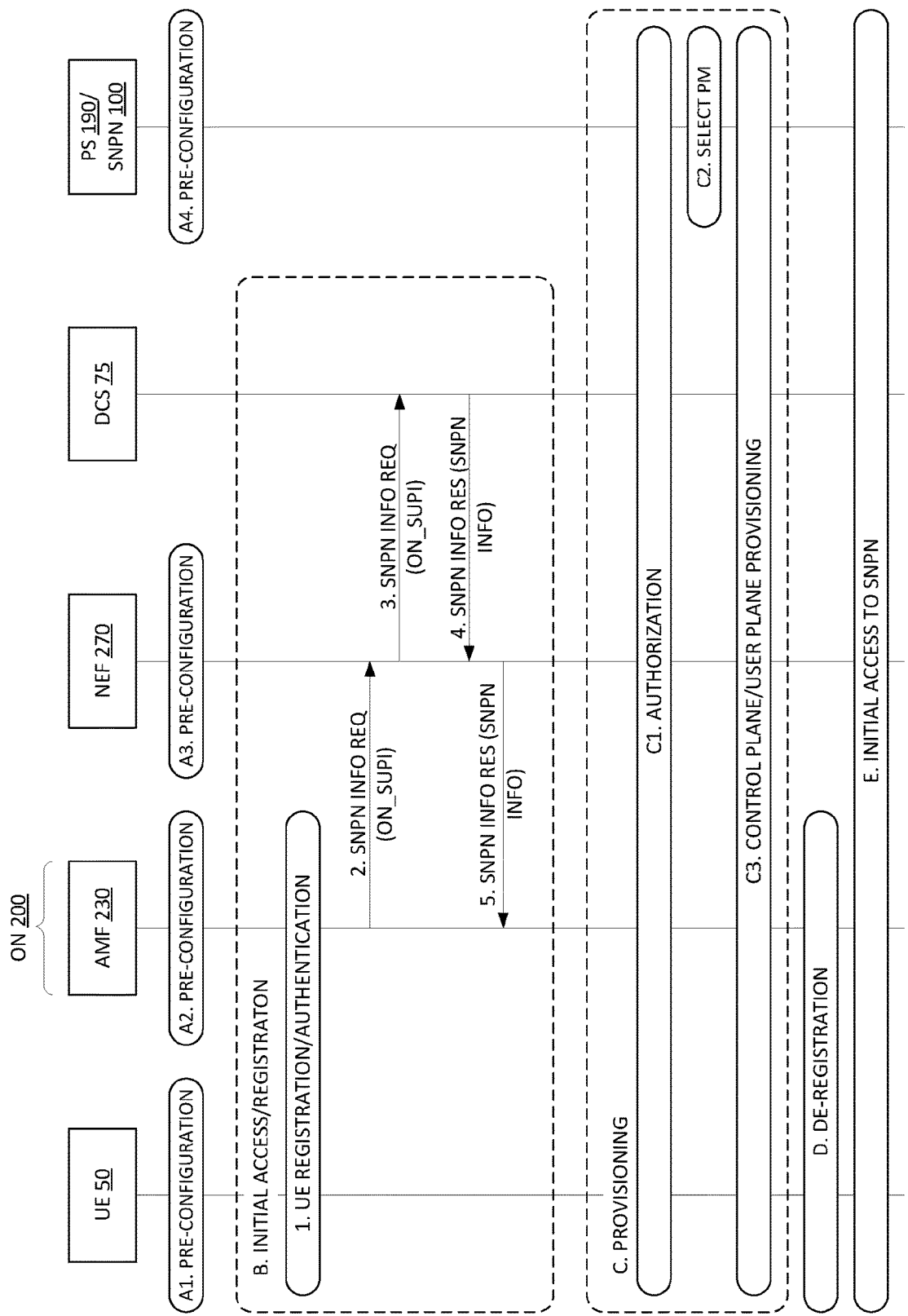
FIG. 5 illustrates an embodiment of the general procedure shown in FIG. 3 providing further details explaining how network information is retrieved from the DCS. In this example, new signaling is provided to enable the onboarding network to request network information from the DCS.

FIG. 5 illustrates an alternate method for retrieving network information from the DCS 75. In this embodiment, after successful authentication of the UE, the AMF 230 in the onboarding network 200 requests SNPN information from the DCS 75 using a new service exposed by the DCS 75. Because the DCS 75 is outside the 3GPP domain, the AMF 230 in the onboarding network 200 may use access this service provided by the DCS 75 via a NEF 270. The SNPN information retrieval proceeds as follows:

B1. The UE 50 registers with the onboarding network 200 using its onboarding SUPI as previously described.

B2, B3. After registration is completed, the AMF 230 sends an information request to the DCS 75 via NEF 270 to request the network information for the UE 50. The information request contains the onboarding SUPI of the UE 50 and is sent via a NEF 270.

B4, B5. The DCS 75 answers, via the NEF 270, the information request. The response includes the SNPN information, such as the PLMN ID and NID if needed.

In the embodiments shown in FIGS. 4 and 5, the DCS 75 may perform a selection of SNPN 100 to be used for the UE 50 if more than one SNPN 100 is authorized. In some embodiments, the selection of the SNPN 100 can be based on the UE location. Different SNPNs 100 can be provided to serve different regions and the SNPN 100 covering the region where the UE 50 is located can be selected. The onboarding network may need to provide location information to the DCS 75. In other embodiments, the selection of the SNPN 100 is based on business agreements with SNPNs 100. These business agreements with SNPNs 100 may include, e.g., certain percentage of UEs per partner, or based on the pre-set agreements with SNPN 100, such as an SNPN has "bought" the UE 50 and is about to put it into use. In other embodiments, the DCS 75 sends the onboarding network 200 a list with the SNPNs 100 that are provided, along with the regions that the SNPNs 100 are intended to serve. The onboarding network 200 selects an SNPN 100 depending on the location of the UE 50.

Figure 6:
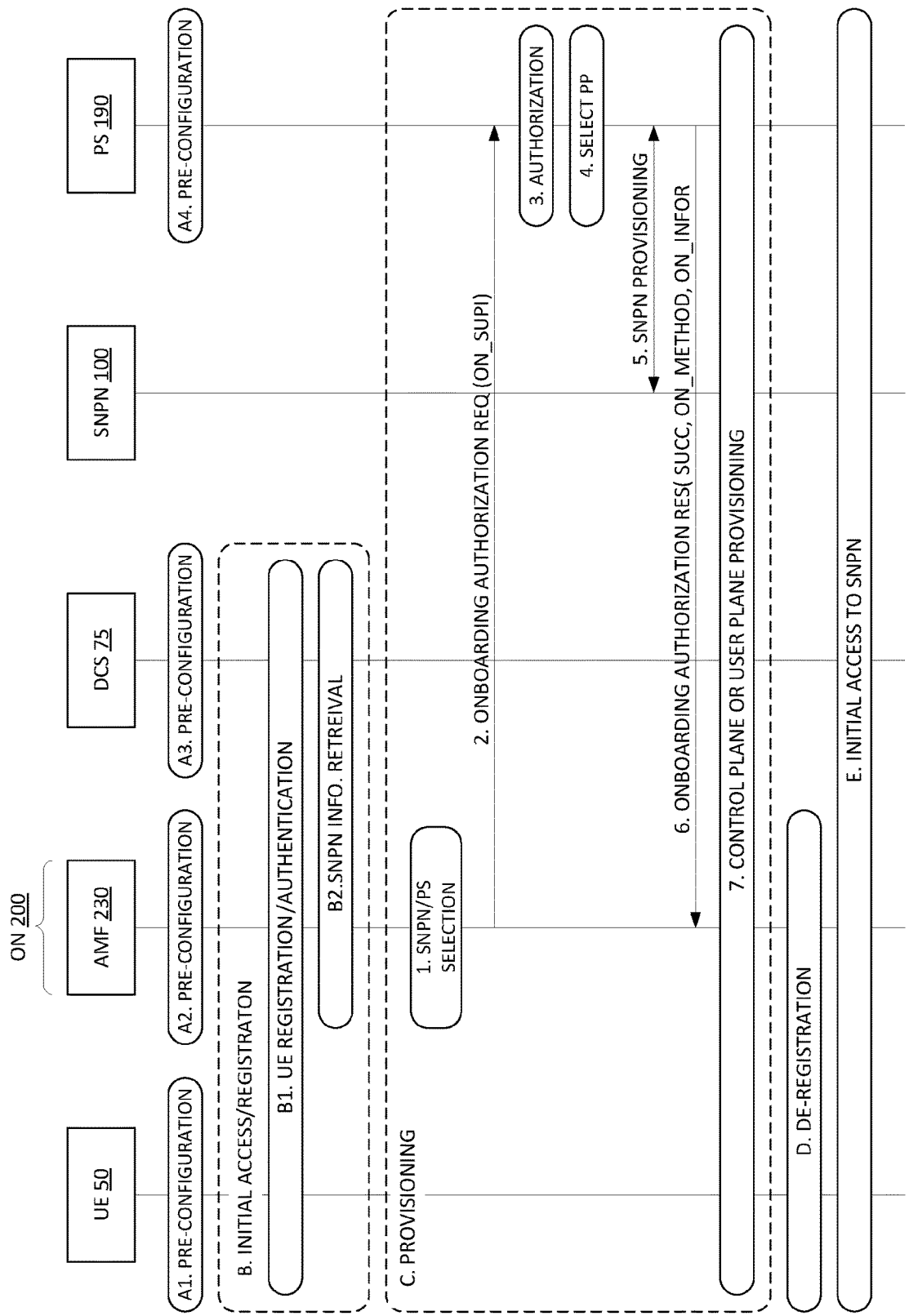
FIG. 6 illustrates an embodiment of the general procedure shown in FIG. 3 providing further details explaining how provisioning is authorized by the SNPN.

FIG. 6 illustrates a procedure for authorizing the onboarding of the UE 50 by the SNPN 100. The execution of this procedure provides the onboarding network 200 and the SNPN 100 with a verification that the UE 50 is legitimately owned (or at least authorized) by the SNPN 100 and prevents rogue or malicious UEs 50 from consuming further resources of the onboarding network 200 and the SNPN 100. If the UE onboarding authorization is successful, the SNPN 100 decides which UE provisioning method applies to the UE 50 and the onboarding network 200.

The authorization procedure proceeds as follows:

C1. After obtaining the SNPN information from the DCS 75, the AMF 230 in the onboarding network 200 selects the SNPN 100 (if the DCS 75 provides more than one) and a provisioning server 190 within the selected SNPN 100. The selection of the SNPN 100 can be based on information provided by the UE 50 (e.g., interaction not shown in the steps in which the UE 50 is provided by available SNPNs 100 and UE 50 selects one) or by selecting an SNPN 100 in the same region. The AMF 230 in the onboarding network 200 uses the PLMN ID and NID of the selected SNPN 100 to discover and select a provisioning server 190 in the selected SNPN 100 (e.g., by using a DNS lookup with a well-known FQDN, including the SNPN 100 domain). For this purpose, the AMF 230 may reuse existing 5GC procedures (i.e., via a Network Repository Function (NRF)). Alternatively, the DCS 75 may also be configured with the addresses/FQDN of the provisioning server 190 per SNPN 100 and provide the information to the AMF 230 in the onboarding network 200.

C2. The AMF 230 in the onboarding network 200 sends an onboarding authorization request to the provisioning server 190 to request authorization to the SNPN 100 for the UE to proceed with the onboarding procedure. The AMF 230 in the onboarding network 200 makes use of a service-based interface (SBI) service exposed by the provisioning server 190 at the selected SNPN 100. The interaction between the AMF 230 in the onboarding network 200 and the provisioning server 190 in the SNPN 100 can be based on the roaming architecture via Security Protection Proxies (SEPPs) or based on exposure interfaces via NEF.

C3. The provisioning server 190 at the SNPN 100 checks if the onboarding SUPI is included in the list of authorized UEs to be onboarded at the SNPN 100 using information pre-configured at the SNPN 100 in step (A4).

C4. If the authorization is successful, the SNPN 100 also decides, based on UE capabilities, agreements with the onboarding network 200, and local policy, whether a control plane UE provisioning or user plane UE provisioning procedure should be authorized.

C5. At this point, the SNPN 100 may trigger any required provisioning action within the SNPN 100 if not already done, e.g., at pre-configuration of onboarding SUPIs in step A4.

C6. The SNPN 100 delivers the authorization decision to the AMF 230 in the onboarding network 200. If authorization is successful, the AMF 230 in the onboarding network 200 also receives the information about the provisioning method to use (control plane or user plane) together with any additional information required for the execution of the selected provisioning method.

C7. A provisioning procedure is performed to provide the UE 50 with its regular UE credentials and additional configuration for accessing the SNPN. The provisioning procedure may comprise a control plane provisioning procedure or a user plane provisioning procedure as instructed by the SNPN 100.

In the onboarding procedures shown in FIGS. 3-6, the UE 50 is not configured with an identity of the SNPN 100. Instead, the identity of the SNPN 100 is learned throughout a secured onboarding procedure. Thus, the device vendor can manufacture the devices and store them until they are sold. Once sold, the device vendor configures its DCS 75 with data (e.g., a certificate) of the SNPN 100 that has acquired them, together with additional data identifying the PLMN, such as the PLMN ID and NID. The advantage is that the device vendor configures a DCS 75, which is a simpler operation than the alternative of re-flashing the firmware of already stored devices to provision the SNPN data.

The onboarding network 200 is not provisioned with the onboarding SUPI of the UE 50, which would require direct and permanent contact between the SNPN 100 and each possible onboarding network 200 in the world for letting the onboarding network 200 the onboarding SUPI of each UE 50 acquired by the SNPN 100. Instead, the solution proposed here allows the onboarding network 200 to retrieve the identity (PLMN ID and NID) of the SNPN 100 that has acquired the device from DCS 75.

The early authorization procedure performed between the onboarding network 200 and the SNPN 100 guarantees that non-authorized UEs 50 are denied access to the network as soon as possible, avoiding resource exhaustion attacks in the onboarding network 200, and avoiding rogue UEs 50 from being provisioned with data that provides access to the SNPN 100.

The SNPN 100 determines, based on UE capabilities, agreements with the onboarding network 200, and local policy, the actual method authorized to the UE 50 for the remote UE provisioning of data.

Figure 7:
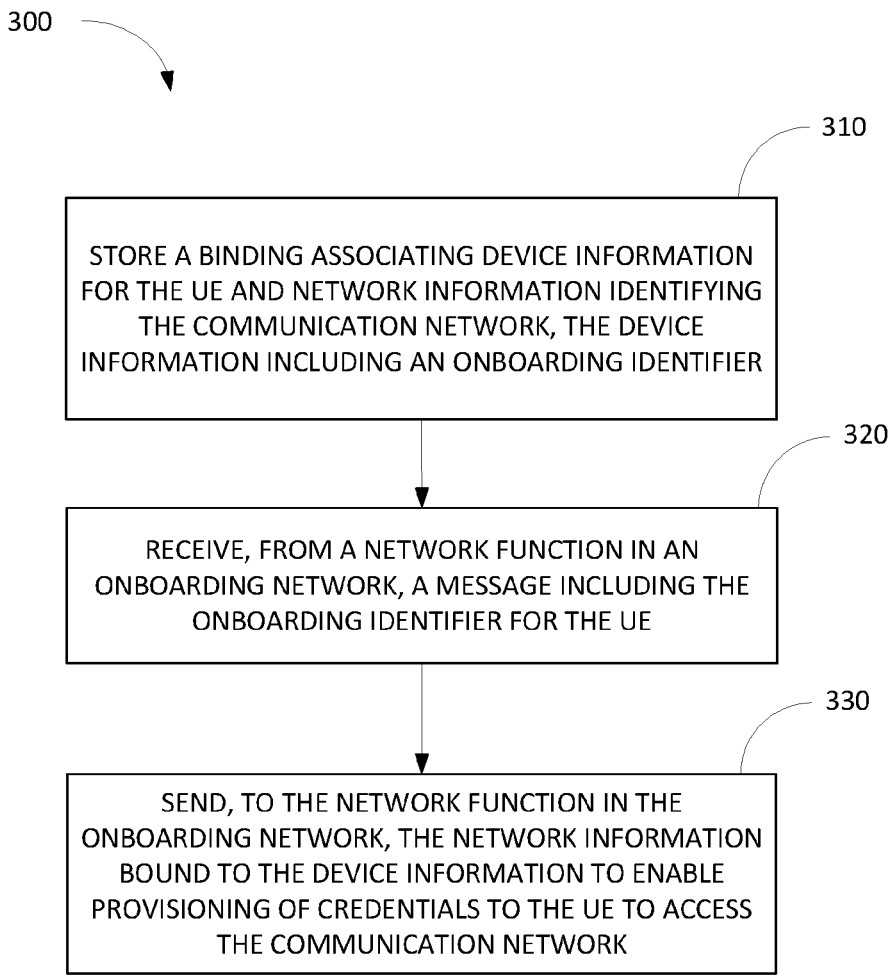
FIG. 7 illustrates an exemplary method implemented by a DCS for providing network information for a SNPN to an onboarding network to enable provisioning of credentials to the UE to access the SNPN.

FIG. 7 illustrates an exemplary method 300 implemented by a DCS 75 for providing network information for a SNPN 100 to an onboarding network to enable provisioning of credentials to the UE 50 to access the SNPN 100. The DCS 75 stores a binding associating device information for the UE 50 and network information identifying the SNPN 100 (block 310). The device information includes an onboarding identifier for the UE 50. The DCS 75 further receives, from a network function in an onboarding network, a message including the onboarding identifier for the UE 50 (block 320). The DCS 75 sends, to the network function in the onboarding network, the network information bound to the device information for the UE 50 to enable provisioning of credentials to the UE 50 to access the SNPN 100 (block 330).

Figure 8:
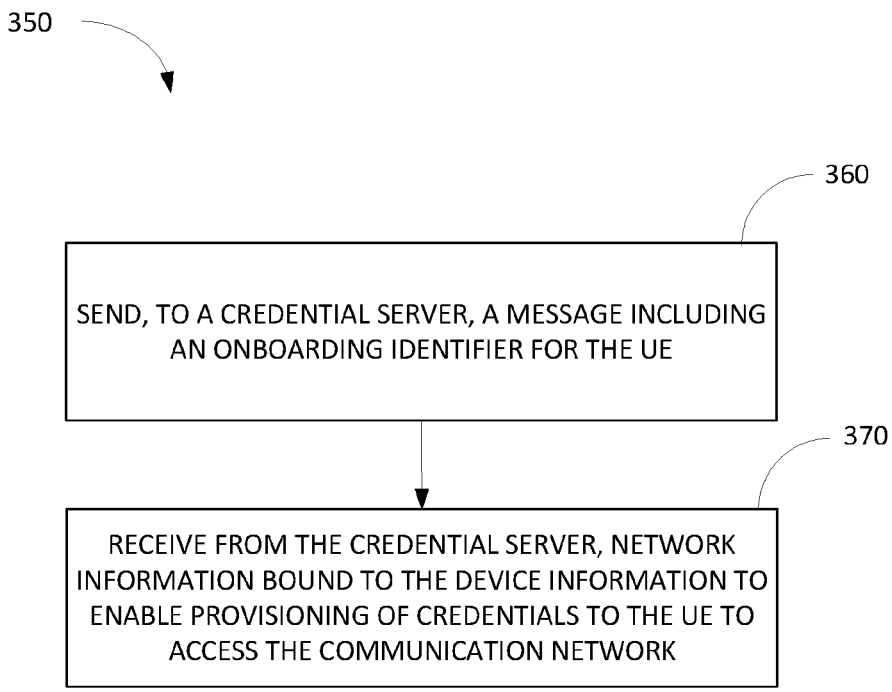
FIG. 8 illustrates an exemplary method implemented by a network node in an onboarding network for obtaining network information for a SNPN from a DCS to enable provisioning of credentials to the UE to access the SNPN.

FIG. 8 illustrates an exemplary method 350 implemented by an AMF 230 or other network node in an onboarding network for obtaining network information for a SNPN 100 from a DCS 75 to enable provisioning of credentials to the UE 50 to access the SNPN 100. The AMF 230 sends a message including an onboarding identifier for the UE 50 to a DCS 75 (block 360). The AMF 230 receives, from the DCS 75, network information bound to the device information for the UE 50 to enable provisioning of credentials to the UE 50 to access the SNPN 100 (block 370).

Figure 9:
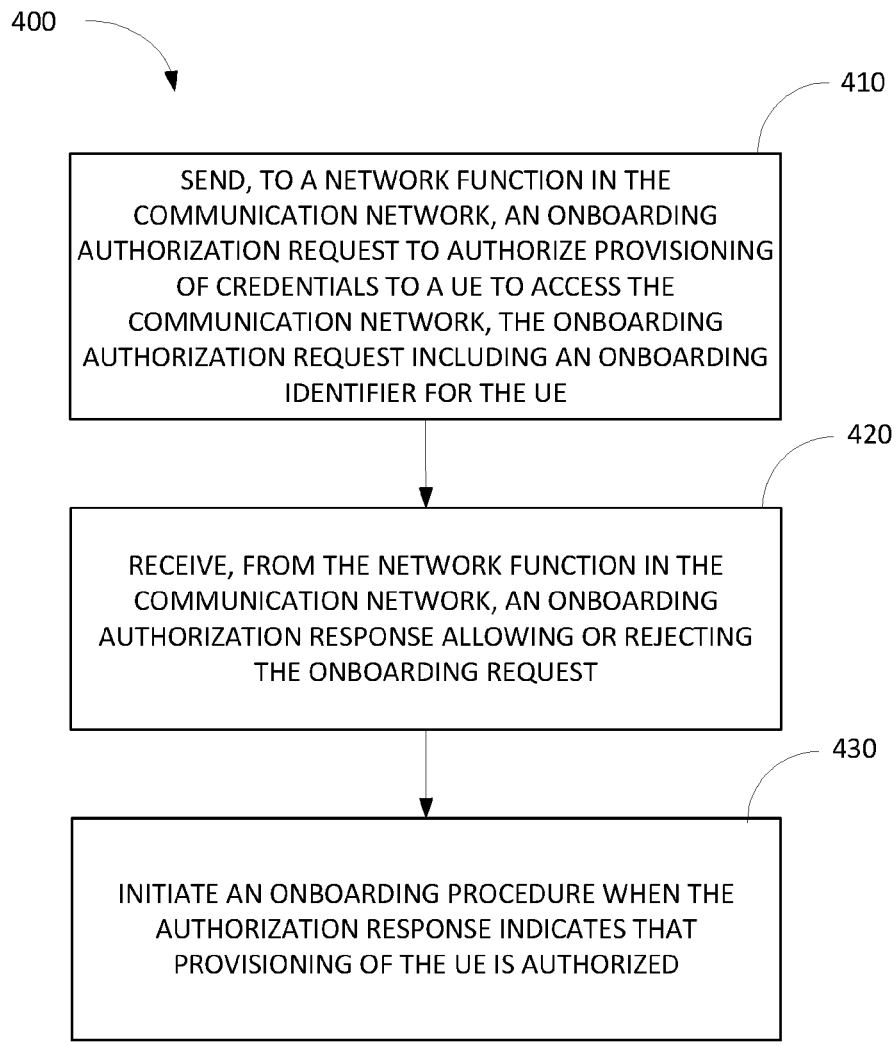
FIG. 9 illustrates an exemplary method implemented by a network node in an onboarding network to obtain authorization for provisioning of a UE with credentials to access a SNPN.

FIG. 9 illustrates an exemplary method 400 implemented by an AMF 230 or other network node in an onboarding network to obtain authorization for provisioning of a UE 50 with credentials to access a SNPN 100. The AMF 230 sends, to a network function (e.g. provisioning server 190) associated with the SNPN 100, an onboarding authorization request to authorize provisioning of credentials to the UE 50 to access the communication network (block 410). The onboarding authorization request includes an onboarding identifier for the UE 50. The AMF 230 further receives an onboarding authorization response from the network function in the SNPN 100 allowing or rejecting the onboarding request (block 470). The AMF 230 initiates an onboarding procedure when the authorization response indicates that provisioning of the UE 50 is allowed (block 480).

Figure 10:
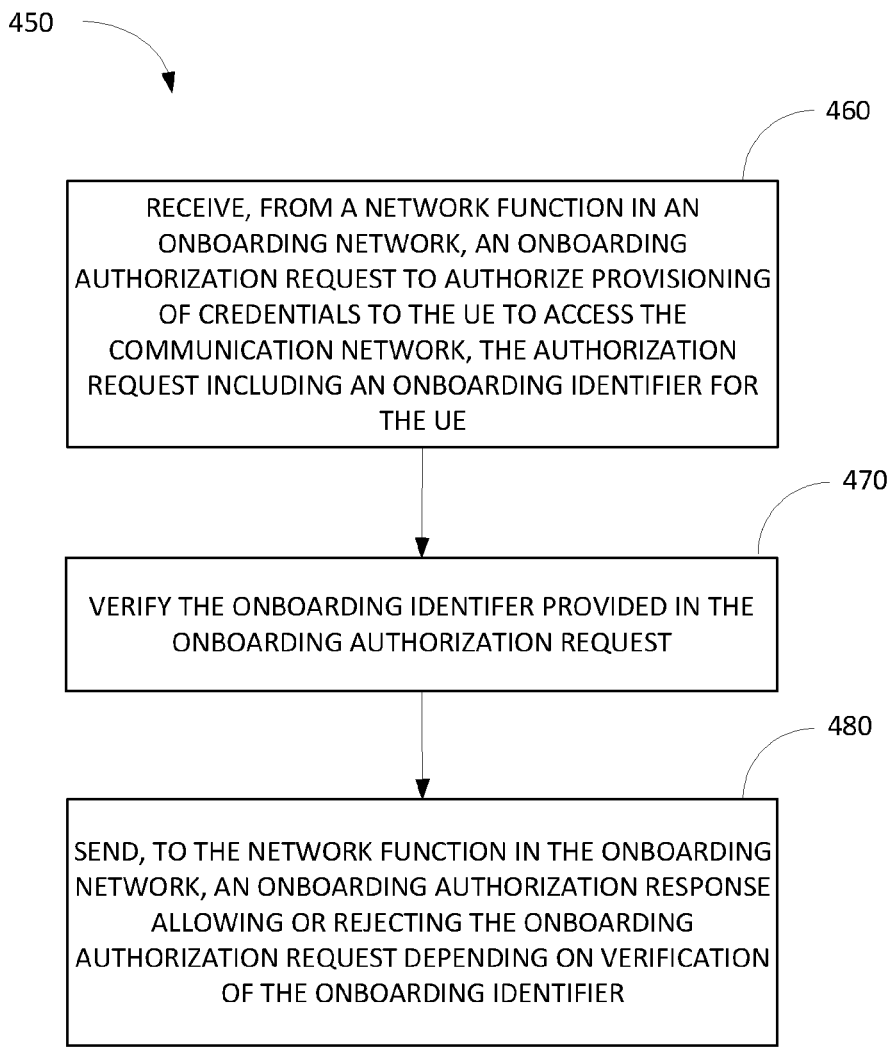
FIG. 10 illustrates an exemplary method implemented by a provisioning server to authorize provisioning of a UE with credentials to access a SNPN.

FIG. 10 illustrates an exemplary method 450 implemented by a provisioning server 190 to authorize provisioning of a UE 50 with credentials to access a SNPN 100. The provisioning server 190 receives, from a network function in an onboarding network, an onboarding authorization request to authorize provisioning of credentials to the UE 50 to access the communication network (block 460). The onboarding authorization request includes an onboarding identifier for the UE 50. The provisioning server 190 further verifies the onboarding identifier provided in the onboarding authorization request (block 420) and sends an onboarding authorization response to the network function in the onboarding network allowing or rejecting the onboarding authorization request depending on verification of the onboarding identifier (block 430).

Figure 11:
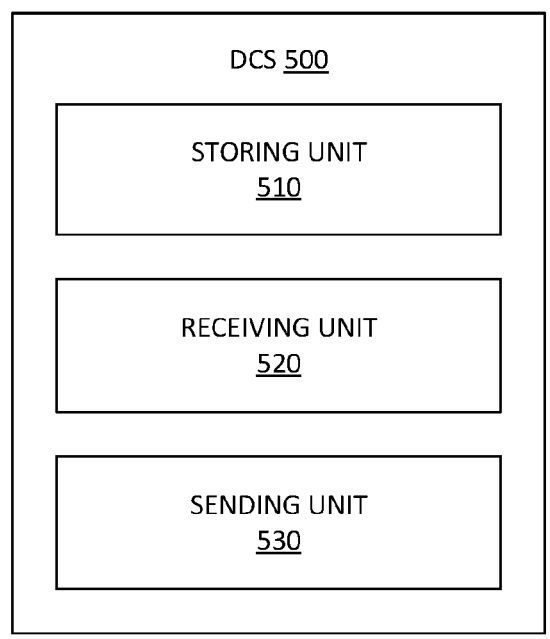
FIG. 11 illustrates an exemplary DCS configured to provide network information for a SNPN to an onboarding network to enable provisioning of credentials to the UE to access the SNPN.

FIG. 11 illustrates an exemplary DCS 500 configured to provide network information for a SNPN 100 to an onboarding network to enable provisioning of credentials to the UE 50 to access the SNPN 100. The DCS 500 includes a storing unit 510, a receiving unit 520 and a sending unit 530. The various units 510-530 can be implemented by hardware and/or by software code that is executed by one or more processors or processing circuits. The storing unit 510 is configured to store a binding associating device information for the UE 50 and network information identifying the SNPN 100. The device information includes an onboarding identifier for the UE 50. The receiving unit 520 is configured to receive, from a network function in an onboarding network, a message including the onboarding identifier for the UE 50. The sending unit 530 is configured to send, to the network function in the onboarding network, the network information bound to the device information for the UE 50 to enable provisioning of credentials to the UE 50 to access the SNPN 100.

Figure 12:
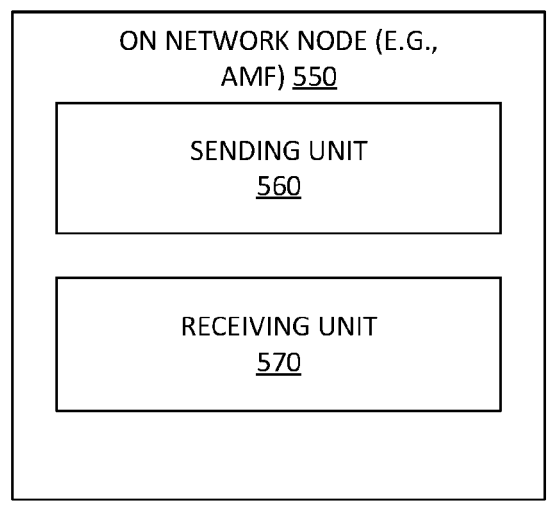
FIG. 12 illustrates an exemplary a network node in an onboarding network configured to obtain network information for a SNPN from a DCS to enable provisioning of credentials to the UE to access the SNPN.

FIG. 12 illustrates an exemplary a network node 550 (e.g., AMF 230) in an onboarding network 200 configured to obtain network information for a SNPN 100 from a DCS 75 to enable provisioning of credentials to the UE 50 to access the SNPN 100. The onboarding network node includes a sending unit 560 and a receiving unit 570. The various units 560-570 can be implemented by hardware and/or by software code that is executed by one or more processors or processing circuits. The sending unit 560 is configured to send a message including an onboarding identifier for the UE 50 to a DCS 75. The receiving unit 570 is configured to receive, from the DCS 75, network information bound to the device information for the UE 50 to enable provisioning of credentials to the UE 50 to access the SNPN 100.

Figure 13:
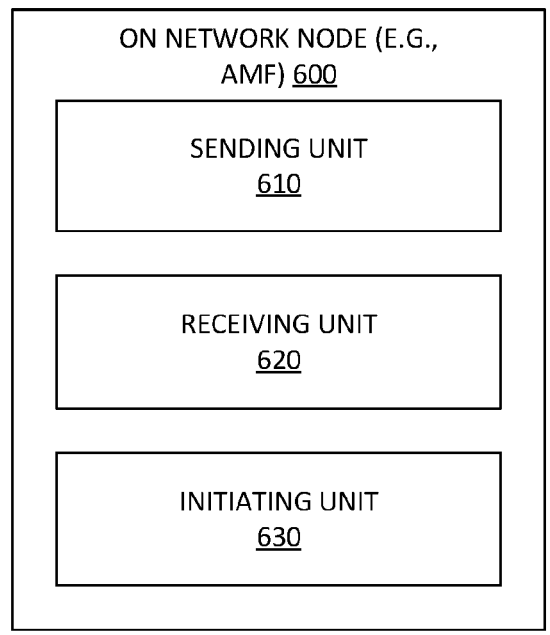
FIG. 13 illustrates a network node in an onboarding network configured to obtain authorization for provisioning of a UE with credentials to access a SNPN.

FIG. 13 illustrates a network node 600 (e.g., AMF 230) in an onboarding network 200 configured to obtain authorization for provisioning of a UE with credentials to access a SNPN 100. The network node incudes 600 comprises a sending unit 610 and a receiving unit 620 and an initiating unit 630. The various units 610-630 can be implemented by hardware and/or by software code that is executed by one or more processors or processing circuits. The sending unit 610 is configured to send, to a network function (e.g., provisioning server 190) associated with the SNPN 100, an onboarding authorization request to authorize provisioning of credentials to the UE to access the communication network. The onboarding authorization request includes an onboarding identifier for the UE. The receiving unit 620 is configured to receive an onboarding authorization response from the network function in the in the SNPN 100 allowing or rejecting the onboarding request. The initiating unit 630 is configured to initiate an onboarding procedure when the authorization response indicates that provisioning of the UE is allowed.

Figure 14:
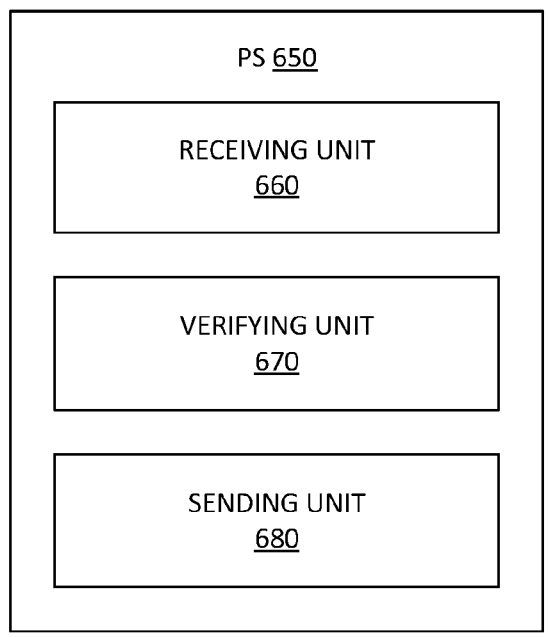
FIG. 14 illustrates an exemplary method implemented by a provisioning server configured to authorize provisioning of a UE with credentials to access a SNPN.

FIG. 14 illustrates an exemplary provisioning server 650 configured to authorize provisioning of a UE 50 with credentials to access a SNPN 100. The provisioning server 650 comprises a receiving unit 660, a verifying unit 670 and a sending unit 680. The various units 660-680 can be implemented by hardware and/or by software code that is executed by one or more processors or processing circuits. The receiving unit 660 is configured to receive, from a network function in an onboarding network, an onboarding authorization request to authorize provisioning of credentials to the UE to access the communication network. The onboarding authorization request includes an onboarding identifier for the UE. The verifying unit 670 is configured to verify the onboarding identifier provided in the onboarding authorization request. The sending unit 680 is configured to send an onboarding authorization response to the network function in the onboarding network allowing or rejecting the onboarding authorization request depending on verification of the onboarding identifier.

Figure 15:
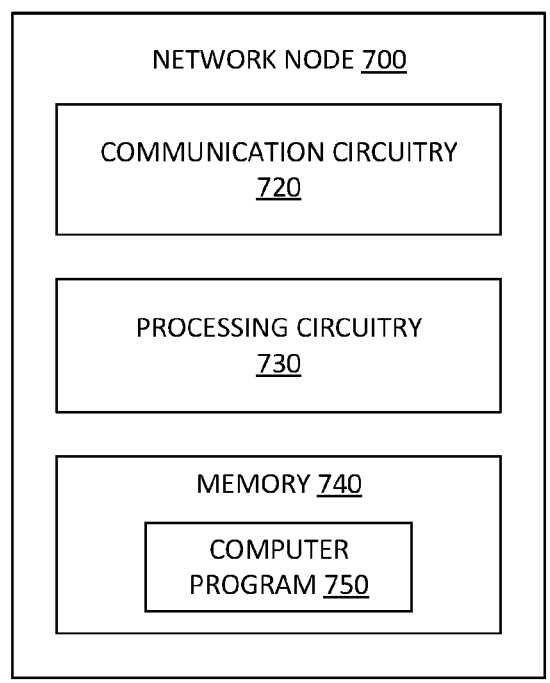
FIG. 15 illustrates a network node configured to facilitate onboarding of a UE in a SNPN.

FIG. 15 illustrates a network node 700 configured to facilitate onboarding of a UE win a SNPN 100. The network node 700 comprises communication circuitry 720, processing circuitry 730, and memory 740.

The communication circuitry 720 comprises circuitry for communicating with other networked devices over a communication network. The processing circuitry 730 controls the overall operation of the network node 700 and implements the one or more of the procedures as herein described. The processing circuitry 730 may comprise one or more microprocessors, hardware, firmware, or a combination thereof. The processing circuitry 730 is configured to perform the onboarding procedures as herein described.

Memory 740 comprises both volatile and non-volatile memory for storing computer program code and data needed by the processing circuitry 730 for operation. Memory 740 may comprise any tangible, non-transitory computer-readable storage medium for storing data including electronic, magnetic, optical, electromagnetic, or semiconductor data storage. Memory 740 stores a computer program 750 comprising executable instructions that configure the processing circuitry 730 to implement the procedures and methods as described herein. A computer program 750 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 750 for configuring the processing circuitry 730 as herein described may be stored in a removable memory, such as a portable compact disc, portable digital video disc, or other removable media. The computer program 750 may also be embodied in a carrier such as an electronic signal, optical signal, radio signal, or computer readable storage medium.

Those skilled in the art will also appreciate that embodiments herein further include corresponding computer programs. A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

In the onboarding procedures as described herein provide a mechanism for discovering the network information for a UE 50 and thus avoid the need to re-flash the firmware of the UE 50 after it is acquired. Further, there is no need to provision the onboarding network 200 with the onboarding SUPI of the UE 50. Instead, the solution proposed here allows the onboarding network 200 to retrieve the identity (PLMN ID and NID) of the SNPN 100 that has acquired the device from DCS 75.

The early authorization procedure performed between the onboarding network 200 and the SNPN 100 guarantees that non-authorized UEs 50 are denied access to the network as soon as possible, avoiding resource exhaustion attacks in the onboarding network 200, and avoiding rogue UEs 50 from being provisioned with data that provides access to the SNPN 100.

What is claimed is:

1. A method implemented by a credential server to support provisioning of a User Equipment (UE) in a standalone non-public network (SNPN), the method comprising: storing a binding associating device information for the UE and network information identifying the SNPN, the device information including an onboarding identifier; receiving, from a network function in an onboarding network, an authentication request message requesting authentication of the UE, the authentication request message including the onboarding identifier of the UE; and sending, to the network function in the onboarding network in response to the authentication request message, an authentication response message comprising the network information bound to the device information to enable provisioning of credentials to the UE to access the SNPN.

2. The method of claim 1, wherein the device information further comprises onboarding credentials for authenticating the UE in the onboarding network.

3. The method of claim 1, wherein the credential server stores binding information associating the device information for the UE and network information for multiple standalone non-public networks (SNPNs).

4. The method of claim 3, wherein sending the network information to the network function comprises sending the network information for the multiple SNPNs to the network function.

5. A credential server comprising: processing circuitry and a memory, the memory storing instructions executable by the processing circuitry whereby the credential server is configured to: store a binding associating device information for a User Equipment (UE) and network information identifying a standalone non-public network (SNPN), the device information including an onboarding identifier; receive, from the network function in an onboarding network, an information request message requesting authentication of the UE, the authentication request message including the onboarding identifier for the UE; and send, to the network function in the onboarding network in response to the authentication request message, an authentication response message comprising the network information bound to the device information to enable provisioning of credentials to the UE to access the SNPN.

6. The credential server of claim 5, wherein the device information further comprises onboarding credentials for authenticating the UE in the onboarding network.

7. The credential server of claim 5, wherein the credential server stores binding information associating the device information for the UE and network information for multiple standalone non-public networks (SNPNs).

8. The credential server of claim 7, wherein to send the network information to the network function the credential server is configured to send the network information for the multiple SNPNs to the network function.

9. A method implemented by a credential server to support provisioning of a User Equipment (UE) in a standalone non-public network (SNPN), the method comprising: storing a binding associating device information for the UE and network information identifying the SNPN, the device information including an onboarding identifier; receiving, from a network function in an onboarding network, an information request message including the onboarding identifier of the UE; and sending, to the network function in the onboarding network in response to the information request message, the network information bound to the device information to enable provisioning of credentials to the UE to access the SNPN.

10. The method of claim 9, wherein the device information further comprises onboarding credentials for authenticating the UE in the onboarding network.

11. The method of claim 9, wherein the credential server stores binding information associating the device information for the UE and network information for multiple standalone non-public networks (SNPNs).

12. The method of claim 11, wherein sending the network information to the network function comprises sending the network information for the multiple communication networks SNPNs to the network function.

13. A credential server comprising: processing circuitry and a memory, the memory storing instructions executable by the processing circuitry whereby the credential server is configured to: store a binding associating device information for a User Equipment (UE) and network information identifying a standalone non-public network (SNPN), the device information including an onboarding identifier; receive, from the network function in an onboarding network, an information request message including the onboarding identifier for the UE; and send, to the network function in the onboarding network in response to the information request message, the network information bound to the device information to enable provisioning of credentials to the UE to access the SNPN.

14. The credential server of claim 13, wherein the device information further comprises onboarding credentials for authenticating the UE in the onboarding network.

15. The credential server of claim 13, wherein the credential server stores binding information associating the device information for the UE and network information for multiple standalone non-public networks (SNPNs).

16. The credential server of claim 15, wherein to send the network information to the network function the credential server is configured to send the network information for the multiple SNPNs to the network function.

* * * * *